Figure 1:
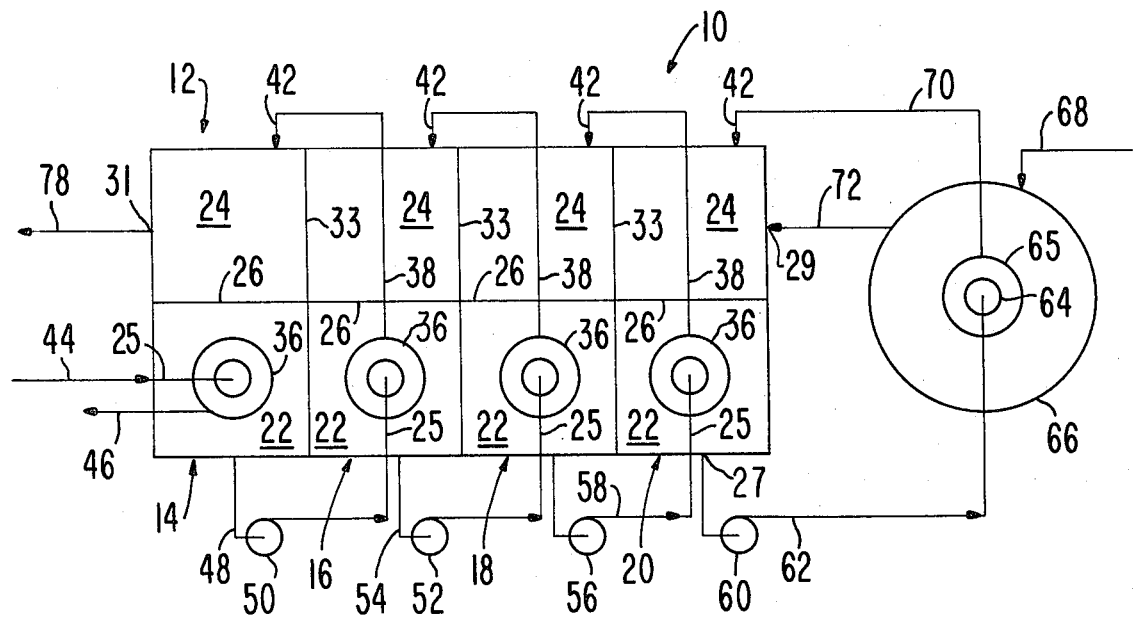

United States Patent [19]

Rogers et al.

[11] 4,366,066

[45] Dec. 28, 1982

[54] STABILIZATION OF SOFTENED WATER WITH SELF-GENERATED $CO_2$

[75] Inventors: Alfred N. Rogers, Pleasanton; Leon Awerbuch; Sherman C. May, both of San Francisco, all of Calif.

[73] Assignee: Bechtel International Corporation, San Francisco, Calif.

[21] Appl. No.: 248,648

[22] Filed: Mar. 27, 1981

[51] Int. Cl.³ .......................... C02F 1/06; C02F 1/20; C02F 5/02
[52] U.S. Cl. .................................. 210/696; 202/173; 203/7; 203/11; 210/712; 210/718; 210/737; 210/188; 210/199
[58] Field of Search ...................... 202/173; 203/7, 11; 210/696, 712, 718, 737, 750, 765, 774, 180, 181, 188, 192, 195.1, 199, 205, 218

[56] References Cited
U.S. PATENT DOCUMENTS

| | | | |
|---|---|---|---|
| 3,119,752 | 1/1964 | Checkovich | 203/34 |
| 3,218,241 | 11/1965 | Checkovich | 203/34 |
| 3,814,671 | 6/1974 | Roller | 203/7 |
| 4,018,656 | 4/1977 | Rogers et al. | 203/11 |
| 4,138,851 | 2/1979 | Rogers et al. | 203/11 |
| 4,247,371 | 1/1981 | Roller | 210/696 |

*Primary Examiner*—Peter A. Hruskoci
*Attorney, Agent, or Firm*—Townsend and Townsend

[57] ABSTRACT

Apparatus and a method of adding $CO_2$ to softened water flowing through a series of interconnected flash chambers after the softened water has been directed out of a settler. The inlet of the settler receives preheated hard water after the hard water has passed through a series of interconnected preheating chambers, there being a preheating chamber for each flash chamber, respectively. Each preheating chamber and the corresponding flash chamber comprise a stage of a multi-stage water softening system, the preheating and flash chambers of each stage being separated by a partition defining an opening near the top portion of the stage to place the respective first and second chambers of each stage in fluid communication with each other and to allow flashed, heated water vapor from the flash chamber to pass into direct, admixing contact with cooler, hard water sprayed into the preheating chamber to preheat the hard water. As the hard water is preheated by the flashed water vapor in each preheating chamber, $CO_2$ is evolved and then directed into a predetermined flash chamber, such as the flash chamber of the next downstream stage with reference to the direction of flow of softened water through the stages. The $CO_2$ stabilizes the softened water and reduces its pH. The $CO_2$ evolved from the settler is also directed into a flash chamber, such as the upstream flash chamber for stabilization and pH lowering purposes.

12 Claims, 2 Drawing Figures

STABILIZATION OF SOFTENED WATER WITH SELF-GENERATED CO₂

This invention relates to improvements in the softening of hard water and, more particularly, to apparatus and a method for stabilizing softened hard water which still contains $CaCO_3$ by the use of $CO_2$, which $CO_2$ is generated from the pre-heating and softening of the hard water itself and not from an external source.

BACKGROUND OF THE INVENTION

In the softening of a hard water, bicarbonate hardness can be reduced by the application of heat to that water in accordance with the well known reaction:

$$Ca(HCO_3)_2 \xrightarrow{\text{Heat}} CaCO_3 \downarrow + H_2O + CO_2 \uparrow$$

The greater portion of the $CaCO_3$ which is formed by this reaction is precipitated and removed as a sludge. The $CO_2$ is vented to the atmosphere. As a result the pH of the hard water is increased. When it is required to remove magnesium ions from water, which ions concurrently carry with them some of the silica impurities of the water, a further increase in pH of the water is produced by the addition of lime to provide an additional softening of the water and to eliminate the silica impurities. In either case, the precipitation of the hardness is incomplete because of the slow kinetics of the chemical reactions involved, and the hardness compounds continue to precipitate after the water has been discharged from the softening equipment.

The customary method for preventing the formation of scale deposits such as the above in water which has been softened is the acidification of that water by means of a mineral acid or by the injection of $CO_2$ from an external source, either of which increases the production costs of conventional water softening techniques. To reduce such costs, a need has arisen for improvements which do not rely upon acidification or the use of $CO_2$ from an external source to prevent scaling by the softened water.

Prior publications relating to the softening of hard water include U.S. Pat. No. 4,018,656 and the references cited therein, and a publication entitled "Conversion of Desalination Plant Brines to Solids," by W. L. Standiford, Research and Development Progress Report No. 636, Contract 14-30-2660, U.S. Department of the Interior, 1970. However, these prior publications do not teach or suggest the concept of using self-generated $CO_2$ for stabilization of softened water.

SUMMARY OF THE INVENTION

The present invention satisfies the aforesaid need for improvements which reduce costs by providing apparatus and a method of treating softened water with $CO_2$ generated within the apparatus itself during and from the preheating of the hard water being softened by conventional means. This permits the softened water to be stabilized without the need for an external source of $CO_2$ and substantial economies to be realized.

To this end, the present invention provides a multistage water softening system in which hard water to be softened is moved in one direction through a series of first, preheating chambers to a settler. The hard water is progressively preheated by flashed water vapor from respective, adjacent flash chambers supplied with softened water from the settler and flowing in a direction opposite to the direction of flow of the hard water.

In each preheating stage of this invention, $CO_2$ is evolved and directed into a predetermined flash chamber for mixing with the softened water therein for stabilization of the softened water. This feature is not taught or suggested by the prior art of water softening. When so stabilized, the calcium in the softened water remains in soluble bicarbonate form rather than $CaCO_3$ and the pH of the softened water is lowered. This prevents the scaling of material when the calcium is in $CaCO_3$ form.

The settler in this invention also provides a source of $CO_2$ for one of the flash chambers, typically the first or upstream flash chamber. Preferably, the $CO_2$ from each preheating chamber is directed into the flash chamber of the next downstream stage with reference to the direction of flow of softened water although $CO_2$ from a preheating chamber can be directed to any one or more of the flash chambers.

The primary object of the present invention is to provide a multistage apparatus and method of softening hard water without the need for $CO_2$ from an external source or acid by using the $CO_2$ generated in the apparatus when the incoming hard water is preheated to stabilize the softened water.

Other objects of this invention will become apparent as the following specification progresses, reference being had to the accompanying drawings for an illustration of the invention.

IN THE DRAWING

Figure 2:
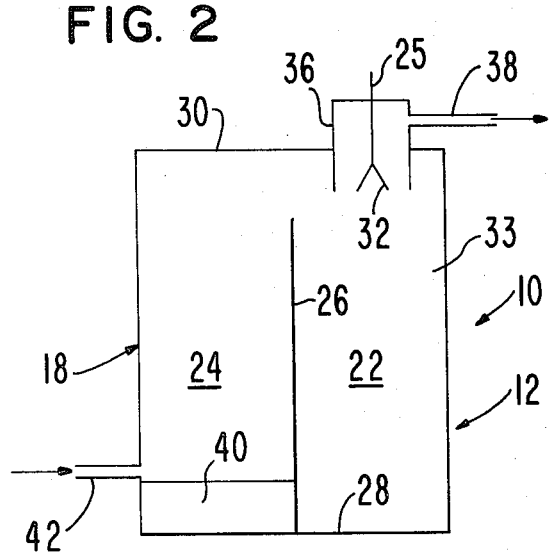

FIG. 1 is a schematic top plan view of a multistage apparatus for carrying out the method of stabilizing softened water by self-generated $CO_2$; and FIG. 2 is a schematic, end elevational view of one of the stages of the apparatus of FIG. 1.

The apparatus of this invention is broadly denoted by the numeral 10 and includes a vessel 12 comprised of a number of side-by-side stages 14, 16, 18, and 20. Each of stages 14, 16, 18 and 20 includes a first chamber 22 for receiving hard water and a second chamber 24 for receiving softened water. A typical stage, such as stage 18, is shown in FIG. 2.

Chambers 22 of the various stages 14, 16, 18 and 20 are interconnected with each other so that hard water can flow along a first path in one direction progressively through the stages beginning at the fluid inlet line 25 of chamber 22 of stage 14 (FIG. 1) and ending at the outlet 27 of chamber 22 of stage 20. Similarly, chambers 24 of the various stages 14, 16, 18 and 20 are interconnected with each other so that softened water from a settler 66 can flow along a second path in the opposite direction progressively through the stages beginning at the fluid inlet 29 of chamber 24 of stage 20 and ending at outlet 31 of chamber 24 of stage 14.

Chambers 22 and 24 of each stage are separated by a partition 26 which extends upwardly from the bottom 28 of the stage as shown in FIG. 2, the upper margin of partition 26 being below the top wall 30 of the stage. An imperforate wall 33 separates one stage from the next adjacent stage.

Each stage has a spray nozzle 32 coupled to the fluid inlet line 25 passing through a shroud or inverted cup-shaped member 36 extending into chamber 22 through top wall 30 as shown in FIG. 2. Each shroud is open only at its lower end. A fluid line 38 is in fluid communication with the interior of shroud 36 for directing a gas outwardly therefrom.

Each wall 33 has an inlet orifice 40 near the lower portion thereof. Each orifice 40 places chamber 24 of one stage in fluid communication with chamber 24 of the next adjacent stage. A fluid inlet line 42 communicates with each second chamber 24 at a location above the upper margin of the corresponding orifice 40 as shown in FIG. 2.

Hard water enters vessel 12 along line 44 coupled to the corresponding fluid inlet line 25 connected to the spray head 32 of stage 14. The water is sprayed into chamber 22 of stage 14 and is combined with heated water vapor from the adjacent chamber 24, such water vapor being generated by flashing in the adjacent chamber 24 and passing over the corresponding partition 26 and directly mixing with the hard water as it is sprayed into chamber 22. $CO_2$ evolved in heating of the hard water in stage 14 rises and is received in and then removed from the corresponding shroud 36 to the atmosphere by way of fluid line 46 or is directed into a chamber 24 of one of the stages through the corresponding fluid inlet line 42 to stabilize the softened water therein.

The preheated hard water in chamber 22 of stage 14 is directed out of stage 14 along line 48 by a pump 50 and directed to the spray head 32 of stage 16 which sprays the hard water into the chamber 22 of stage 16. The spray of hard water in stage 16 is preheated by flashed water vapor from chamber 24 of stage 16 after the flashed water vapor has passed over the corresponding partition 26. The $CO_2$ envolved in the heating of the hard water in the chamber 16 rises and is received in and then removed from the corresponding shroud 36 through line 38 and to the inlet fluid line 42 of chamber 24 of stage 14 or to the inlet line 42 of any other chamber 24. This $CO_2$ mixes with the flashed water in chamber 24 of stage 14 to stabilize the softened water by causing it to be saturated and by reducing its pH.

The preheated feed water from chamber 22 of stage 16 is directed by a pump 52 from stage 16 through a line 54 and to the spray head 32 of stage 18, where the hard water is sprayed into the corresponding chamber 22 and preheated by flashed water vapor from the corresponding chamber 24. The same result occurs, namely, that the hard water is further preheated and $CO_2$ is evolved from such preheating. The evolved $CO_2$ flows along the corresponding line 38 to the inlet line 42 of chamber 24 of stage 16 or to line 42 of any other chamber 24. Finally, hard water from stage 18 is directed by a pump 56 through a line 58 to the spray head 32 of stage 20, where the preheating process and evolution of $CO_2$ are repeated. The evolved $CO_2$ from chamber 22 of stage 20 is directed along the corresponding line 38 to the fluid inlet line 42 of stage 18 or to any other chamber 24 for mixing with flashed water in chamber 24 to stabilize the softened water therein.

Hard water from chamber 22 of stage 20 is directed through outlet 27 by a pump 60 along the line 62 to the spray head 64 within a shroud 65 of a large settler or softener 66 where the hard water is further heated by live steam admitted into settler 66 by way of line 68. $CO_2$ is evolved from this heating of the hard water and is directed along a line 70 to fluid inlet line 42 of chamber 24 of stage 20 or to fluid inlet line 42 of any other chamber 24.

Softened water flowing out of settler 66 flows along a fluid line 72 and enters chamber 24 of stage 20 at inlet 29 thereof. Because of the relatively high pressure and temperature of the softened water due to pumps 50, 52, 54 and 56 and settler 66, the softened water flashes in chamber 24 of stage 20 and the flashed water mixes with the evolved $CO_2$ flowing into chamber 24 of stage 20 from line 70.

Thus, the softened water is stabilized and becomes substantially saturated from a slightly supersaturated state. Also, the pH of the softened water in chamber 24 of stage 20 is reduced. Accordingly, the softened water will not deposit scale in chamber 24 of stage 20 upon cooling.

The flashed water vapor flows progressively from one chamber 24 to the next from stage 20 to stage 14 through inlet orifices 40 in the adjacent walls 33. In each chamber 24, the entering softened water is flashed and mixes with the evolved $CO_2$ entering the same chamber through the corresponding fluid inlet line 42. This stabilizes the softened water by preventing the formation of scale upon cooling. The flashed water vapor in each chamber 24 passes upwardly and over the corresponding partition 26 for admixture with the incoming, sprayed hard water in the adjacent chamber 22. The softened water that does not flash into vapor continues successively through chambers 24 until the softened water reaches outlet 31.

The softened water in chamber 24 of stage 14 is removed from vessel 12 through outlet 31 along a line 78 and leaves the system as cooled, softened water which is saturated with respect to $CaCO_3$ and has a relatively low pH. The softened water can then be used for any desired purpose or stored for later use without continued precipitation of scale.

It is apparent that a small fraction of the evolved $CO_2$ will have a tendency to cross partition 26 in each stage from chamber 22 to chamber 24. This movement is impeded by the flashed water vapor from the adjacent chamber 24 which moves in the opposite direction.

The foregoing description relates to a four stage apparatus; however, the apparatus can have any number of stages starting with a minimum of two stages. Although the evolved $CO_2$ is delivered to a chamber 24 one stage upstream of the stage in which the $CO_2$ is evolved, it is possible to divert some or all of the evolved $CO_2$ to chambers 24 of two or more stages upstream, realizing that some efficiency may be sacrificed thereby.

What is claimed is:

1. Apparatus for softening hard water comprising: a structure having means defining a series of first interconnected chambers for successively receiving a flow of hard water; settler means coupled with the downstream end of such series of first chambers for heating the hard water therefrom to a temperature sufficient to cause the hard water to become softened and for separating precipitated calcium carbonate from the softened water, said structure further having means defining a series of second interconnected chambers for successively receiving a pressurized flow of softened water from said softening means, there being a second chamber for each first chamber, respectively, the second chambers defining flash chambers for the softened water, there being a fluid flow path interconnecting each second chamber with a respective first chamber to permit flashed water vapor generated in the second chamber to flow into direct, admixing contact with hard water flowing into the corresponding first chamber to thereby cause said hard water to be preheated in the first chamber by the water vapor and to evolve $CO_2$ as it is being preheated in the first chamber; and means coupled with at least one of the first chambers for directing the $CO_2$ evolved therein into a predetermined second chamber for admixture with the softened water therein to stabilize the softened water wherein said predetermined second chamber includes the next downstream second chamber with reference to the direction of flow of softened water through the second chambers.

2. Apparatus as set forth in claim 1, wherein each first chamber has a fluid inlet and a spray head coupled to the fluid inlet, said directing means having an inlet end adjacent to the spray head.

3. Apparatus as set forth in claim 2, wherein each first chamber has a shroud surrounding the spray head thereof to receive $CO_2$ evolved in the first chamber, said directing means including a fluid line having an inlet end in fluid communication with the shroud.

4. An apparatus as set forth in claim 1, wherein said directing means includes a tube for each first chamber, respectively, each tube being coupled between the respective first chamber and a predetermined second chamber.

5. Apparatus as set forth in claim 1, wherein the settler has means for collecting $CO_2$ evolved from the heating of hard water therein, and means coupled with said collecting means for directing the $CO_2$ from the settler to at least one of the second chambers.

6. Apparatus as set forth in claim 5, wherein said means for directing $CO_2$ from the settler includes a fluid line coupled with the inlet of the second chamber at the upstream end of said series of second chambers.

7. Apparatus as set forth in claim 1, wherein said structure has a top wall and a plurality of side-by-side stages, each stage having a first chamber and a second chamber, there being a partition separating each first chamber from the respective second chamber, the partition being spaced below from the top wall of the structure to define said fluid flow path interconnecting the respective first and second chambers, the structure having a generally vertical wall separating each pair of adjacent stages, respectively.

8. Apparatus for softening hard water comprising: a multi-stage system having a series of interconnected first chambers and a series of interconnected second chambers, there being a second chamber for each first chamber, respectively, said first chambers having inlets for successively receiving hard water and said second chambers having inlets for successively receiving softened water; a settler coupled between the outlet end of the series of first chambers and the inlet end of the series of second chambers, said settler including means for heating said hard water to a temperature sufficient to evolve $CO_2$ and cause the hard water to become softened, and means for separating precipitated calcium carbonate from the softened water; a partition separating each first chamber, respectively, from the corresponding second chamber, said partition being spaced below the upper extremity of the corresponding stage to permit fluid communication between the respective first and second chambers, there being a common wall between each pair of adjacent stages, respectively, each second chamber defining a flash chamber to permit the softened water flowing therein to flash to form flashed water vapor movable into the adjacent first chamber to preheat the hard water entering the first chamber and to evolve $CO_2$ from the heating of hard water in the first chamber; and means coupled with each of at least certain of the first chambers, respectively, for directing the $CO_2$ evolved therein into predetermined second chambers, whereby the $CO_2$ entering the second chambers will stabilize the softened water therein wherein said predetermined second chamber includes the next downstream second chamber with reference to the direction of flow of softened water through the second chambers.

9. Apparatus as set forth in claim 8, wherein is included a closed vessel, said stages being in end-to-end relationship in the vessel, each first chamber being in side-by-side relationship to the respective second chamber in the vessel.

10. A method of treating hard water containing calcium comprising: directing a continuous flow of hard water along a first path; progressively heating said hard water as it flows along said first path; urging said heated hard water through a region at which the hard water is further heated to a temperature sufficient to soften the water and precipitated calcium carbonate is separated from the softened water, said urging step being performed after the hard water has moved along said first path, whereby the heated hard water becomes softened water; directing the softened water along a second path; progressively lowering the pressure of the softened water as it flows along said second path to cause a portion of the softened water to flash into a vapor, said heating step including directing the flashed vapor into direct, admixing contact with the hard water flowing along the first path to heat the hard water in the first path and to evolve $CO_2$ therein; and directing the evolved $CO_2$ from said first path into the second path to stabilize the softened water in the second path to thereby maintain calcium in the softened water in soluble form wherein the first path is formed from a number of first, interconnected chambers and said second path is formed from a number of second, interconnected chamber, there being a second chamber for each first chamber, said $CO_2$ is evolved in each of at least certain of the first chambers and is directed into the next adjacent downstream second chambers.

11. A method as set forth in claim 10, wherein the $CO_2$ evolved in the softening region is directed into one of the second chambers.

12. A method as set forth in claim 11, wherein the $CO_2$ from the softening region is directed into the inlet end of said second path.

* * * * *